United States Patent

Malhotra et al.

(10) Patent No.: US 10,172,058 B1
(45) Date of Patent: Jan. 1, 2019

(54) DATA GATEWAY ALIGNMENT IN A WIRELESS COMMUNICATION NETWORK

(71) Applicant: Sprint Communications Company L.P., Overland Park, KS (US)

(72) Inventors: Rajil Malhotra, Olathe, KS (US); Chidambaram Pavanasam, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/593,877

(22) Filed: May 12, 2017

(51) Int. Cl.
*H04W 36/14* (2009.01)
*H04W 8/18* (2009.01)
*H04L 29/06* (2006.01)
*H04W 60/04* (2009.01)
*H04W 88/16* (2009.01)

(52) U.S. Cl.
CPC ......... *H04W 36/14* (2013.01); *H04L 65/1016* (2013.01); *H04L 65/1046* (2013.01); *H04W 8/18* (2013.01); *H04W 60/04* (2013.01); *H04W 88/16* (2013.01)

(58) Field of Classification Search
CPC ............................ H04W 36/14; H04W 8/18
USPC ..................... 455/435.1, 436, 439
See application file for complete search history.

(56) References Cited

U.S. PATENT DOCUMENTS

| 8,023,944 | B2 | 9/2011 | Huang |
| 8,831,014 | B2 | 9/2014 | Koodli et al. |
| 8,937,924 | B2 | 1/2015 | Choi et al. |
| 9,380,551 | B2 | 6/2016 | Kim et al. |
| 2009/0270097 | A1 | 10/2009 | Gallagher et al. |
| 2011/0075675 | A1* | 3/2011 | Koodli ............... H04L 12/14 370/401 |
| 2012/0269167 | A1 | 10/2012 | Velev et al. |
| 2013/0232267 | A1 | 9/2013 | Shatzkamer et al. |
| 2016/0066219 | A1 | 3/2016 | Poikonen et al. |

\* cited by examiner

Primary Examiner — Chuck Huynh

(57) ABSTRACT

A wireless communication network aligns gateways for wireless user devices. A mobility controller detects attachment of a wireless user device in a source Tracking Area (TA). The mobility manager transfers a message to a policy engine indicating the source TA. The wireless user device exchanges user data over a source access gateway and a source network gateway in the source TA. The mobility controller detects a handover of the wireless user device from the source access gateway to a target access gateway in a target TA. The mobility manager transfers a message to the policy engine indicating the target TA for the wireless user device. The policy engine transfers a reattach message to the source network gateway for delivery to the wireless user device. The wireless user device reattaches in the target TA and exchanges additional user data over the target access gateway and the target network gateway.

11 Claims, 8 Drawing Sheets

US 10,172,058 B1

DATA GATEWAY ALIGNMENT IN A WIRELESS COMMUNICATION NETWORK

TECHNICAL BACKGROUND

Data communication networks serve user communication devices with user data services like internet access, media conferencing, machine communications, social networking, and the like. To extend the range and mobility of these user data services, the data communication networks deploy wireless access networks. The wireless access networks have wireless access points that communicate over the air with wireless user devices. The wireless access points also communicate over data links with access gateways. A single access gateway usually serves multiple wireless access points.

The wireless access networks also have network gateways that communicate with external data systems like the Internet, media servers, enterprise systems, and the like. The network gateways and the access gateways communicate with one another to complete the data path between the wireless user devices and the external data systems. An exemplary data path traverses in order: the wireless user device, wireless access point, access gateway, network gateway, and external data system.

Wireless access networks are geographically separated into Tracking Areas (TAs). The wireless access points each broadcast a TA code for the TA that includes their geographic location. The wireless user devices notify mobility controllers in the wireless access networks when they cross TA boundaries. As the wireless user devices move about, the wireless access points handover wireless the devices among one another.

Eventually, the access gateways that serve the wireless access points also handover some of the wireless user devices among one another. The mobility controller directs these access gateway handovers—typically during a TA Update (TAU) process. After the access gateway handovers, the wireless user devices still communicate through their old network gateways. The use of new access gateways and old network gateways often becomes inefficient. The wireless user devices can reattach in their new TAs to obtain new network gateways to align with their new access gateways. Unfortunately, the technology to drive wireless device reattachments in these inefficient gateway scenarios is not adequate.

TECHNICAL OVERVIEW

A wireless communication network aligns gateways for wireless user devices. A mobility controller detects attachment of a wireless user device in a source Tracking Area (TA). The mobility manager transfers a message to a policy engine indicating the source TA. The wireless user device exchanges user data over a source access gateway and a source network gateway in the source TA. The mobility controller detects a handover of the wireless user device from the source access gateway to a target access gateway in a target TA. The mobility manager transfers a message to the policy engine indicating the target TA for the wireless user device. The policy engine transfers a reattach message to the source network gateway for delivery to the wireless user device. The wireless user device reattaches in the target TA and exchanges additional user data over the target access gateway and the target network gateway.

DETAILED DESCRIPTION

Figure 1:
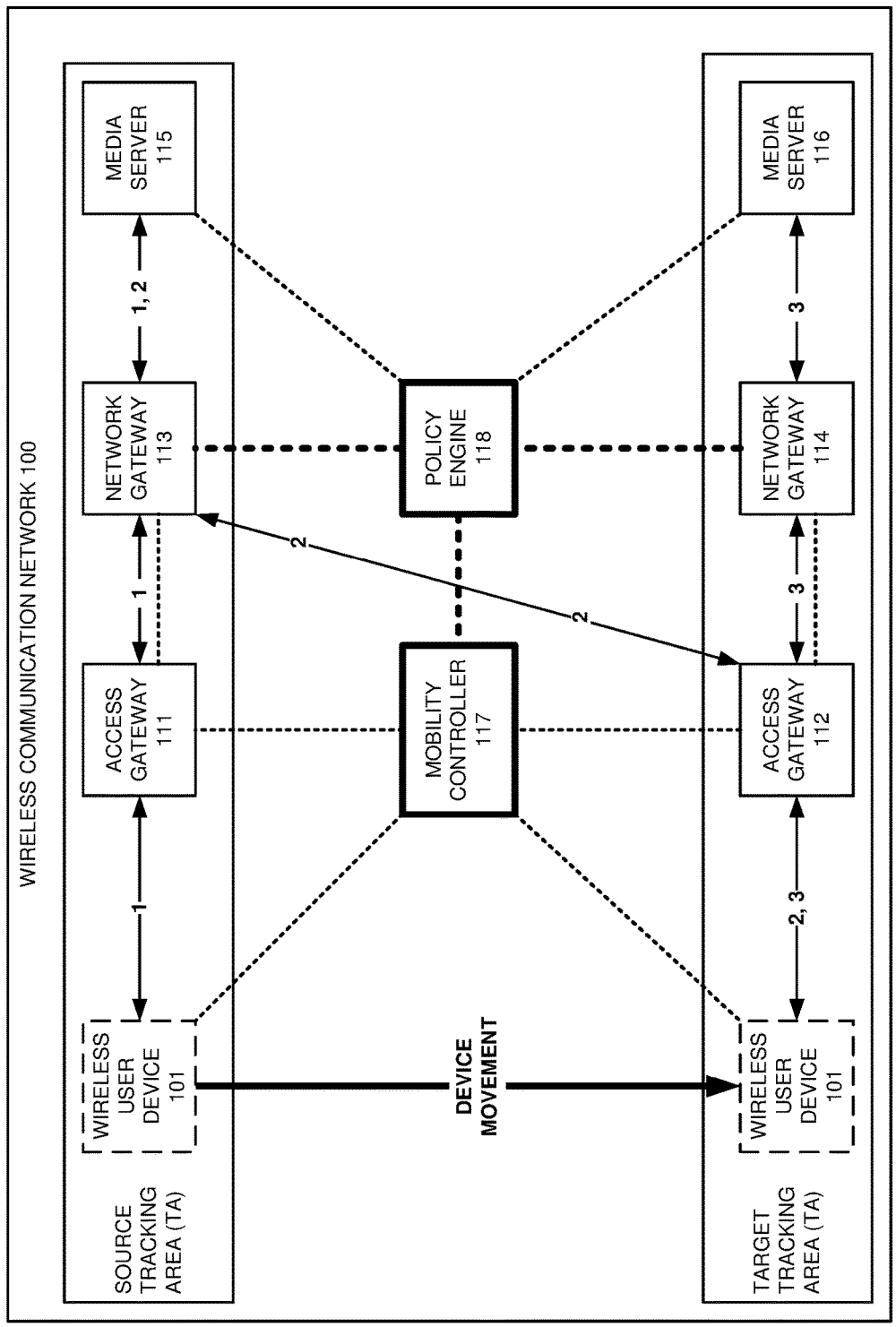
FIGS. 1-2 illustrate a wireless communication network to align access gateways and network gateways.
Figure 2:
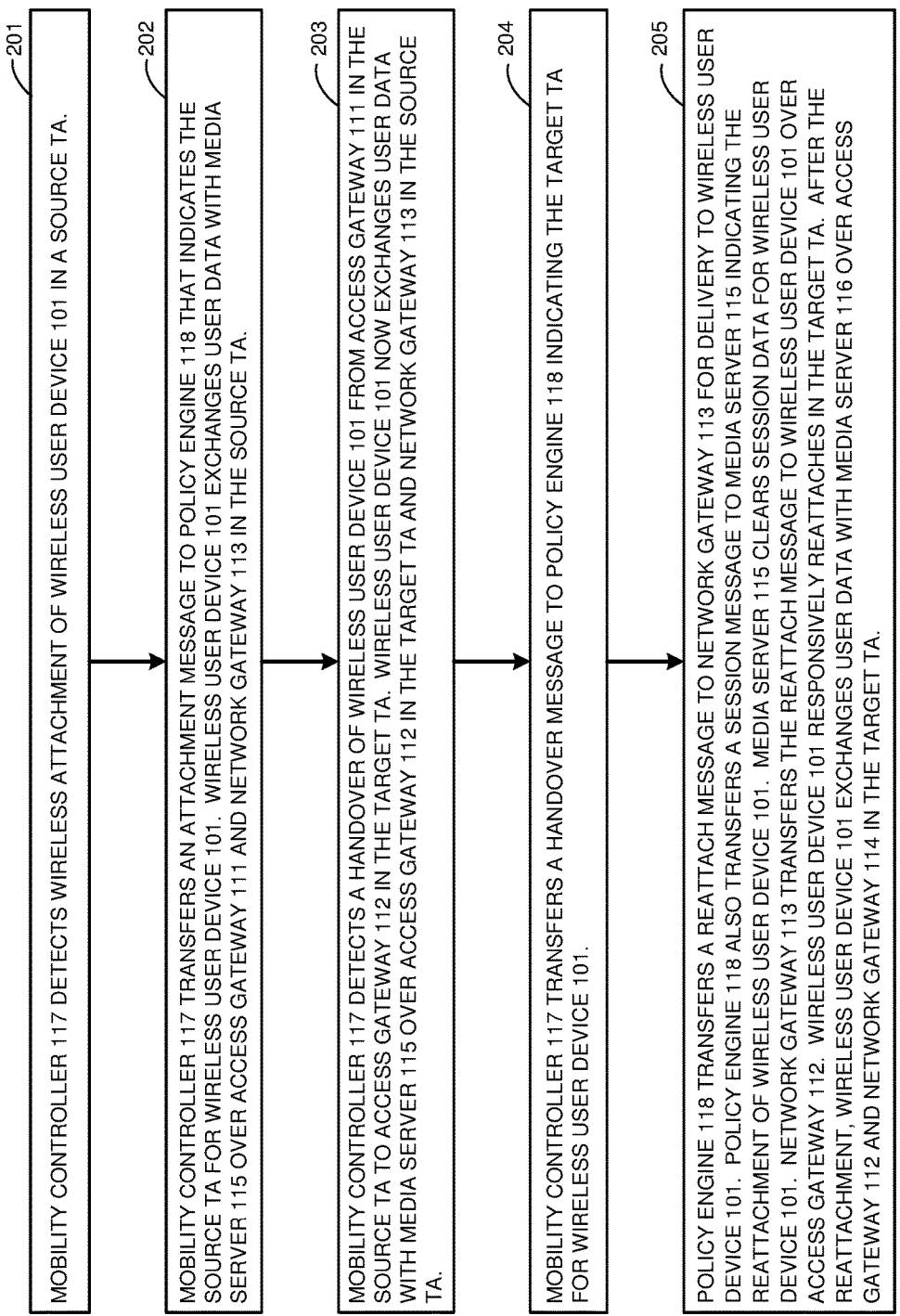

FIGS. 1-2 illustrate wireless communication network 100 to align access gateway 112 and network gateway 114. Wireless communication network 100 delivers wireless data services to wireless user device 101. Exemplary wireless data services include internet access, media conferencing, machine communications, and social networking. Exemplary wireless user devices include computers, phones, media players, and wireless transceivers.

Referring to FIG. 1, wireless communication network 100 comprises access gateways 111-112, network gateways 113-114, media servers 115-116, mobility controller 117, and policy engine 118. These network elements are made of computer systems and software. The computer systems have Central Processing Units (CPUs), Random Access Memory (RAM), data storage, Input/Output (I/O) transceivers, and bus interfaces. The CPUs retrieve the software from the memories and execute the software to direct the operation of the network elements. The software comprises modules for operating system, wireless user device attachment, data service delivery, and network control.

Mobility controller 117 comprises a Long Term Evolution (LTE) Mobility Management Entity (MME) or the like. Policy engine 118 comprises an LTE Policy Charging and Rules Function (PCRF) or the like. Access gateways 111-112 comprise LTE Serving Gateways (S-GWs) or the like. Network gateways 113-114 comprise LTE Packet Data Network Gateways (P-GWs) or the like. Media servers 115-116 comprise Internet Protocol Multimedia Subsystem (IMS) servers or the like. An exemplary IMS server comprises a Proxy Call State Control Function (P-CSCF) server.

A Tracking Area (TA) comprises a geographic region that is served by a set of wireless access points that broadcast the TA. Wireless user device 101 notifies mobility controller 117 when it crosses a TA boundary with a TA Update (TAU). Access gateway 111, network gateway 113, and media server 115 serve a source Tracking Area (TA) and are typically located in proximity to one another. Access gateway 112, network gateway 114, and media server 116 serve a target TA and are typically located in proximity to one another. Mobility controller 117 and policy engine 118 serve both the source TA and the target TA. As indicated by the device movement arrow, wireless user device 101 moves from the source TA to the target TA.

Prior to the device movement, mobility controller 117 detects the wireless attachment of wireless user device 101 in the source TA. In response, mobility controller 117 transfers an attachment message to policy engine 118. The attachment message indicates the source TA for wireless user device 101. Wireless user device 101 exchanges user data with media server 115 over access gateway 111 and network gateway 113 in the source TA. On FIG. 1, this user data transfer is indicated by the "1" arrows.

After the device movement and TA boundary crossing, mobility controller 117 detects the handover of wireless user device 101 from access gateway 111 in the source TA to access gateway 112 in the target TA. After this access gateway handover, wireless user device 101 exchanges user data with media server 115 over access gateway 112 in the target TA and network gateway 113 in the source TA. On FIG. 1, this user data transfer is indicated by the "2" arrows. In response to the access gateway handover, mobility controller 117 transfers a handover message to policy engine 118 indicating the target TA for wireless user device 101.

Policy engine 108 receives the attachment message and the handover message. In response to the access gateway handover, policy engine 118 transfers a reattach message to network gateway 113 for delivery to wireless user device 101. Further in response to the access gateway handover, policy engine 118 transfers a session message to media server 115 indicating the reattachment of wireless user device 101. Media server 115 clears session data for wireless user device 101. Network gateway 113 transfers the reattach message to wireless user device 101 over access gateway 112. In some examples, the reattachment message traverses a Protocol Configuration Options (PCO) link between network gateway 113 and wireless user device 101. Wireless user device 101 responsively reattaches in the target TA.

After the reattachment, wireless user device 101 exchanges user data with media server 116 over access gateway 112 and network gateway 114 in the target TA. On FIG. 1, this user data transfer is indicated by the "3" arrows. This data transfer between wireless user device 101 and media server 116 over access gateway 112 and network gateway 114 in the target TA is more efficient than the old data transfer with media server 115 over access gateway 112 and network gateway 113.

Referring to FIG. 2, the operation of wireless communication network 100 to align access gateway 112 and network gateway 114 is described. Mobility controller 117 detects wireless attachment of wireless user device 101 in a source TA (201). Mobility controller 117 transfers an attachment message to policy engine 118 that indicates the source TA for wireless user device 101 (202). Wireless user device 101 exchanges user data with media server 115 over access gateway 111 and network gateway 113 in the source TA.

Mobility controller 117 then detects a handover of wireless user device 101 from access gateway 111 in the source TA to access gateway 112 in the target TA (203). Wireless user device 101 now exchanges user data with media server 115 over access gateway 112 in the target TA and network gateway 113 in the source TA. In response to the access gateway handover, mobility controller 117 transfers a handover message to policy engine 118 indicating the target TA for wireless user device 101 (204).

In response to the access gateway handover, policy engine 118 transfers a reattach message to network gateway 113 for delivery to wireless user device 101 (205). Also in response to the access gateway handover, policy engine 118 transfers a session message to media server 115 indicating the reattachment of wireless user device 101 (205). Media server 115 clears session data for wireless user device 101. Network gateway 113 transfers the reattach message to wireless user device 101 over access gateway 112. Wireless user device 101 responsively reattaches in the target TA. After the reattachment, wireless user device 101 more efficiently exchanges user data with media server 116 over access gateway 112 and network gateway 114 in the target TA.

Figure 3:
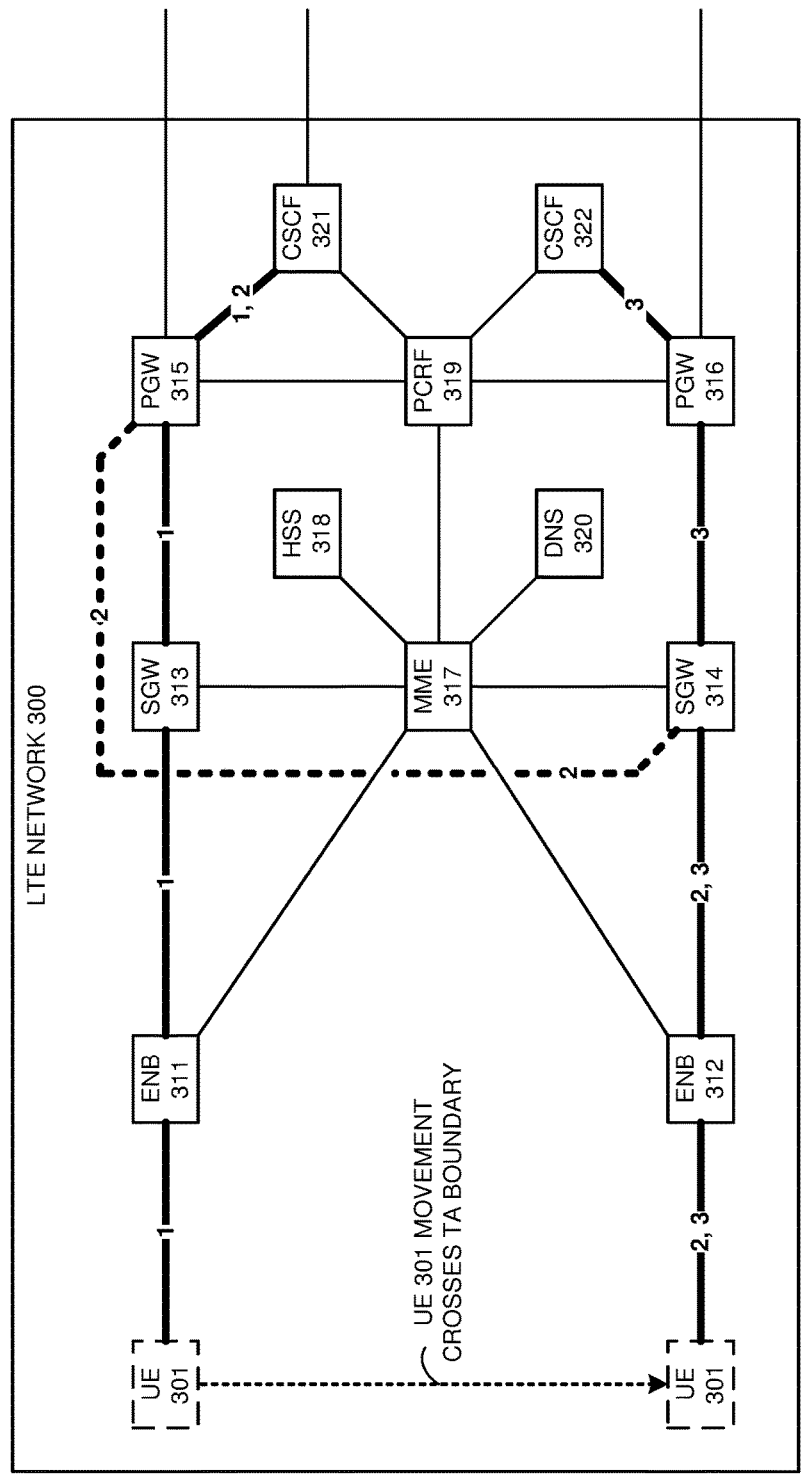
FIG. 3-6 illustrate a Long Term Evolution (LTE) network to align Serving Gateways (S-GWs) and Packet Data Network Gateways (P-GWs).

FIG. 3-6 illustrate Long Term Evolution (LTE) network 300 to align Serving Gateway (S-GW) 312 and Packet Data Network Gateway (P-GW) 314. Referring to FIG. 3, LTE network 300 comprises: User Equipment (UE) 301, evolved Node Bs (ENBs) 311-312, Serving Gateways (S-GWs) 313-314, Packet Data Network Gateways (P-GWs) 315-316, Mobility Management Entity (MME) 317, Home Subscriber System (HSS) 318, Policy Charging and Rules Function (PCRF) 319, Domain Name Server (DNS) 320, and Call State Control Functions (CSCF) 321-322. A source Tracking Area (TA) comprises a geographic region that is served by ENB 311, S-GW 313, and P-GW 315, and CSCF 321. A target TA comprises a different geographic region that is served by ENB 312, S-GW 314, P-GW 316, and CSCF 322. As indicated by the arrow, UE 301 moves across the TA boundary between the source TA and the target TA.

Figure 4:
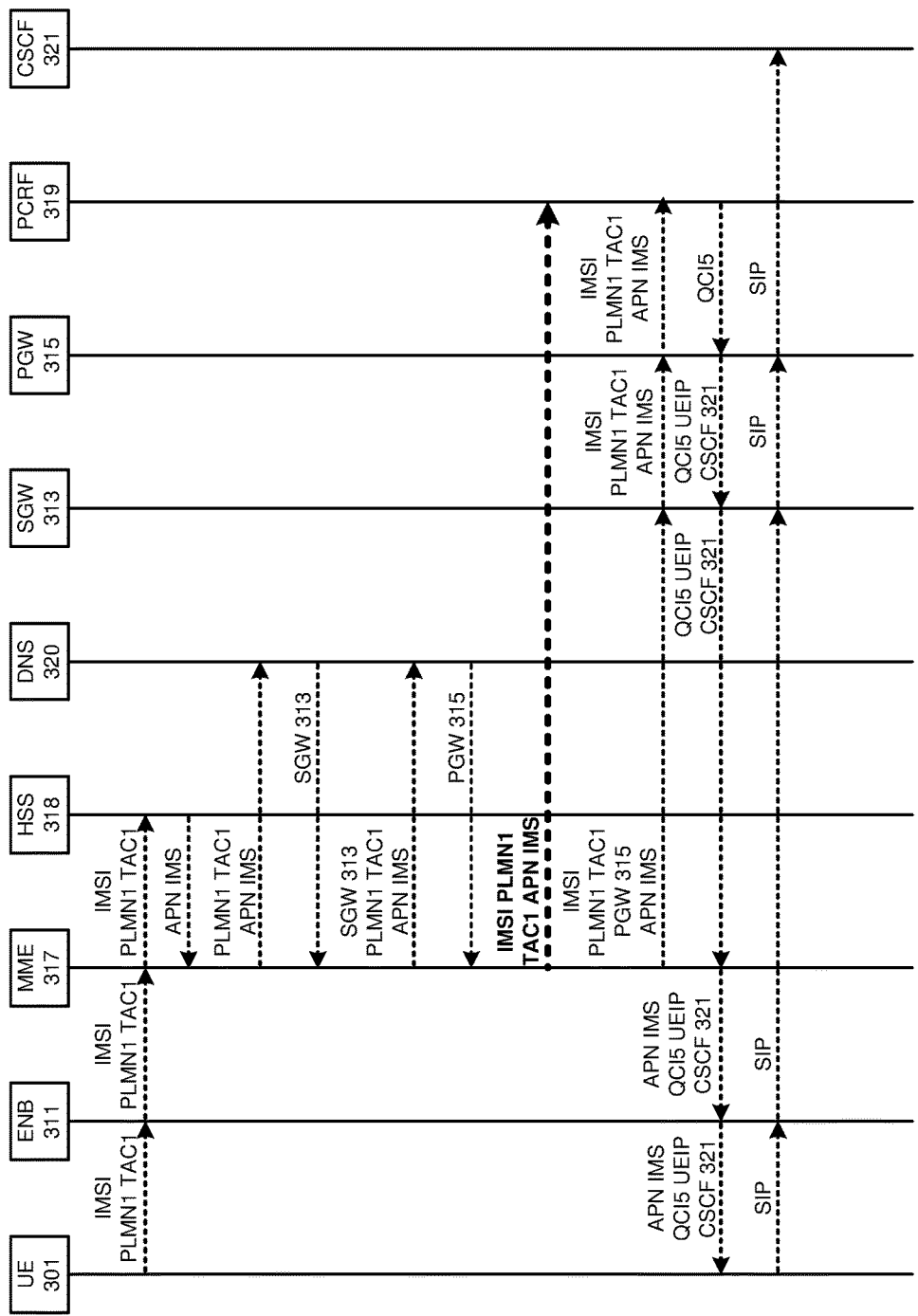

Referring to FIG. 4, the operation of LTE network 300 is described. For clarity, some conventional network signaling has been omitted in the following discussion of LTE attachment, handover, and reattachment. Initially, UE 301 attaches to ENB 311 and transfers its International Mobile Subscriber Identifier (IMSI), Public Land Mobile Network #1 (PLMN1), and Tracking Area Code #1 (TAC1) to ENB 311. ENB 311 transfers the IMSI, PLMN1, and TAC1 to MME 317. MME 317 dips HSS 318 for an Application Point Name (APN) with the IMSI and perhaps PLMN1 and TAC1. HSS 318 translates the IMSI into an APN for IMS service (APN IMS). HSS 318 returns the APN IMS to MME 317.

MME 317 dips DNS 320 for an SGW ID with the APN IMS and TAC1 and perhaps PLMN1. DNS 320 translates the APN IMS and TAC1 into an SGW 313 ID. DNS 320 returns the SGW 313 ID to MME 317. MME 317 dips DNS 320 for a PGW ID with the SGW 313 ID and APN IMS and perhaps PLMN1 and TAC1. DNS 320 translates the SGW 313 ID and APN IMS into a PGW 315 ID. DNS 320 returns the PGW 315 ID to MME 317.

In response to SGW/PGW selection, MME 317 transfers a message to PCRF 319 indicating the IMSI, PLMN1, TAC1, and APN IMS for UE 101. Also in response to SGW/PGW selection, MME 317 transfers a create session message to SGW 313 indicating the IMSI, PLMN1, TAC1, PGW 315 ID, and APN IMS for UE 101. SGW 313 transfers a corresponding create bearer request to PGW 315 that indicates the IMSI, PLMN1, TAC1, and APN IMS for UE 101. PGW 315 dips PCRF 319 for a Quality-of-service Class Identifier (QCI) with the IMSI, PLMN1, TAC1, and APN IMS for UE 101. PCRF 319 translates the IMSI and APN IMS and perhaps PLMN1 and TAC1 into a QCI5 for UE 301. PCRF 319 returns the QCI5 to PGW 315.

PGW 315 selects an Internet Protocol (IP) address and CSCF 321 ID for UE 301. PGW 315 transfers a create bearer request with the QCI5, UE IP, and CSCF 321 ID for UE 301 to SGW 313. SGW 315 transfers a create bearer request with the QCI5, UE IP and CSCF 321 ID for UE 301 to MME 317. MME 317 transfers a session context message to ENB 311 with the APN IMS, QCI5, UE IP, and CSCF 321 ID for UE 301. ENB 311 transfers a connection reconfiguration message to UE 301 with the APN IMS, QCI5, UE IP, and CSCF 321 ID. UE 301 may now transfer Session Initiation Protocol (SIP) signaling to CSCF 321 over ENB 311, SGW 313, and PGW 315—all in the source TA. This SIP path is indicated on FIG. 3 by the "1" arrows.

Figure 5:
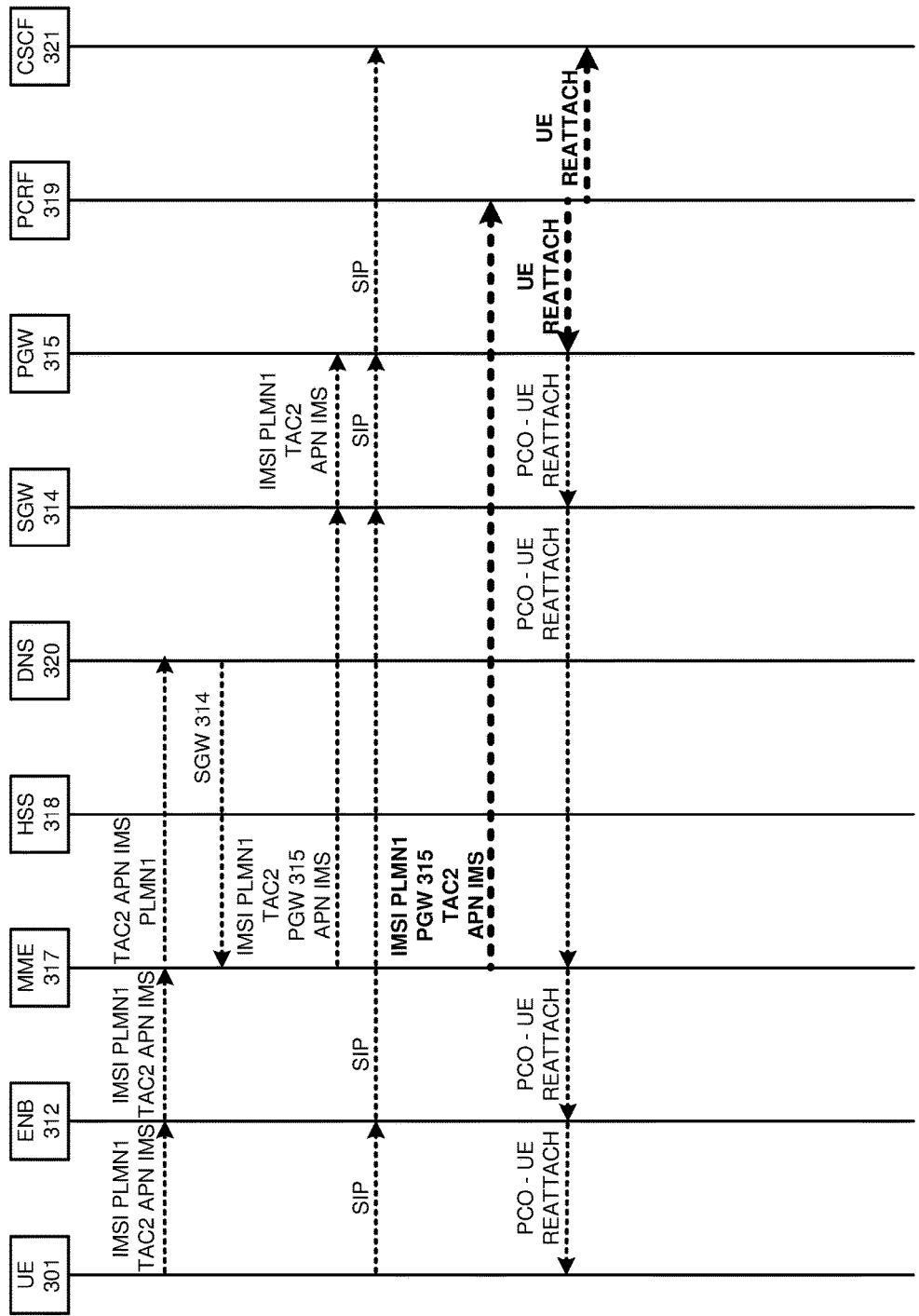

Referring to FIG. 5, UE 301 moves across the TA boundary from the source TA to the target TA and attaches to ENB 312 in the target TA. During attachment, UE 301 transfers the IMSI, PLMN1, TAC2, and APN IMS to ENB 312. ENB 312 transfers the IMSI, PLMN1, TAC2, and APN IMS to MME 317. Responsive to the new TA, MME 317 dips DNS 320 for an SGW ID with TAC2 and IMS APN and perhaps PLMN1. DNS 320 translates TAC2 and the IMS APN into an SGW 314 ID in the target TA. DNS 320 returns the SGW 314 ID to MME 317. MME 317 does not dip DNS 320 for a PGW ID, and thus, old PGW 315 remains on the new SIP path through new SGW 314.

In response to SGW selection, MME 317 transfers a create bearer request to SGW 314 indicating the IMSI, PLMN1, TAC2, PGW 315 ID, and APN IMS for UE 101. SGW 314 transfers an update bearer request to PGW 315 that indicates the IMSI, PLMN1, TAC2, and APN IMS for UE 101. UE 301 may now transfer SIP signaling to CSCF 321 over ENB 312, SGW 314, and PGW 315 that span both TAs. This SIP path is indicated on FIG. 3 by the "2" arrows.

Also in response to SGW selection, MME 317 transfers a message to PCRF 319 indicating the IMSI, PLMN1, TAC2, and APN IMS for UE 101. In response to the new TAC2, IMS APN, and IMSI (and perhaps PLMN1), PCRF 319 transfers a reattach message for UE 301 to PGW 315 in the source TA. PGW 315 transfers the reattach message in Protocol Configuration Options (PCO) data to UE 301. The PCO data traverses SGW 314, MME 317, and ENB 312 between PGW 315 and UE 301. PCRF 319 also transfers a reattach message for UE 301 to CSCF 321 which clears its UE context.

Figure 6:
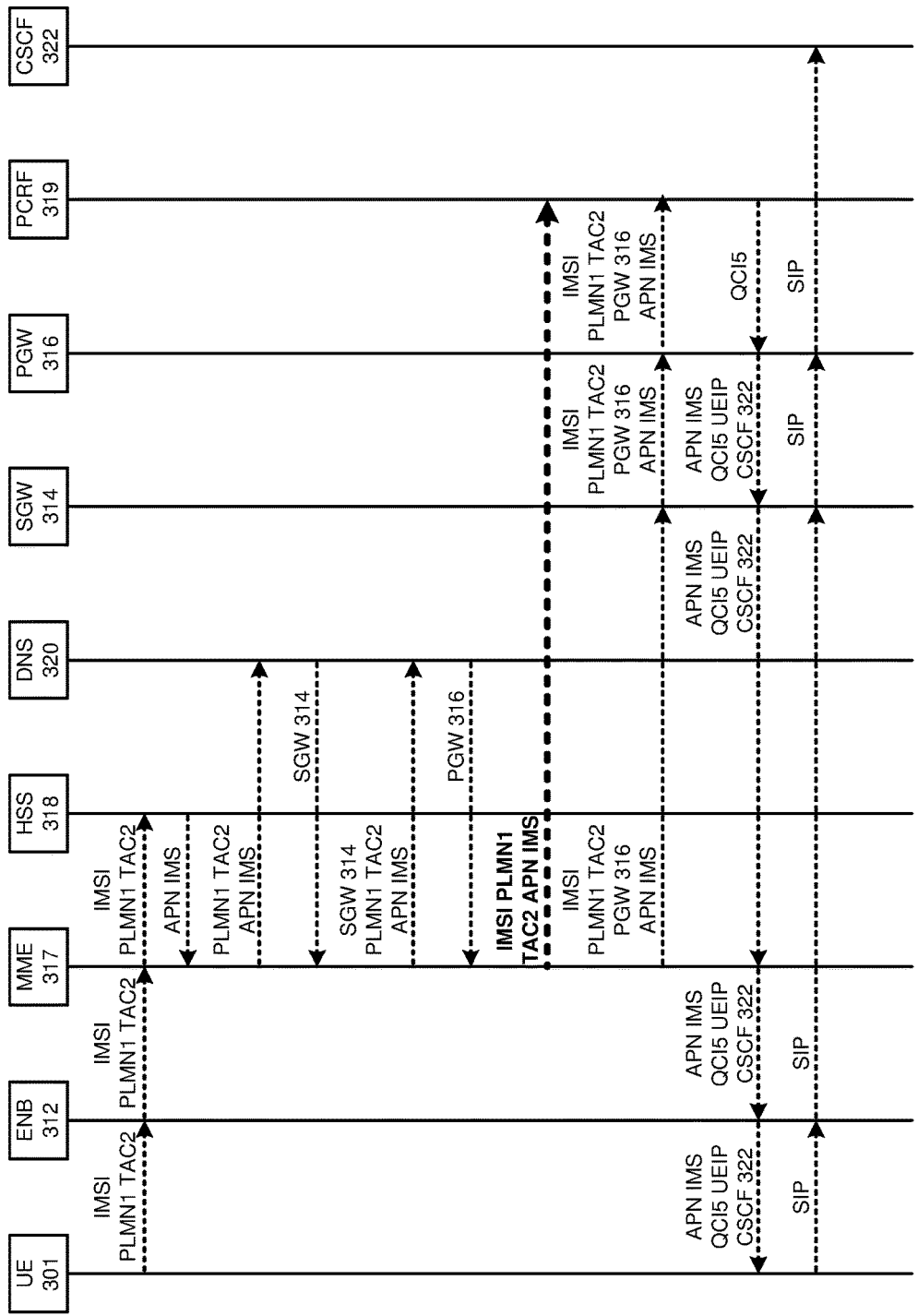

Referring to FIG. 6, UE 301 reattaches to ENB 312 responsive to the reattach message and transfers its IMSI, PLMN1, and TAC2 to ENB 312. ENB 312 transfers the IMSI, PLMN1, and TAC2 to MME 317. MME 317 dips HSS 318 for an APN with the IMSI and perhaps PLMN1 and TAC2. HSS 318 translates the IMSI into APN IMS. HSS 318 returns the APN IMS to MME 317. MME 317 dips DNS 320 for an SGW ID with the APN IMS and TAC2 and perhaps PLMN1. DNS 320 translates the APN IMS and TAC2 into an SGW 314 ID. DNS 320 returns the SGW 314 ID to MME 317. MME 317 dips DNS 320 for a PGW ID with the SGW 314 ID and APN IMS and perhaps PLMN1 and TAC2. DNS 320 translates the SGW 314 ID and APN IMS into a PGW 316 ID. DNS 320 returns the PGW 316 ID to MME 317.

In response to SGW/PGW selection, MME 317 transfers a message to PCRF 319 indicating the IMSI, PLMN1, TAC2, and APN IMS for UE 101. Also in response to SGW/PGW selection, MME 317 transfers a modify session message to SGW 314 indicating the IMSI, PLMN1, TAC2, PGW 316 ID, and APN IMS for UE 101. SGW 314 transfers a corresponding create bearer request to PGW 316 that indicates the IMSI, PLMN1, TAC2, and APN IMS for UE 101. PGW 316 dips PCRF 319 for a QCI with the IMSI and APN IMS and perhaps PLMN1 TAC2 for UE 301. PCRF 319 translates the IMSI and APN IMS and perhaps PLMN1 and TAC1 into a QCI5 for UE 301. PCRF 319 returns the QCI5 to PGW 316.

PGW 316 selects an IP address and CSCF 322 ID for UE 301. PGW 316 transfers a create bearer request with the QCI5, UE IP, and CSCF 322 ID for UE 301 to SGW 314. SGW 314 transfers a create bearer request with the QCI5, UE IP and CSCF 322 ID for UE 301 to MME 317. MME 317 transfers a session context message to ENB 312 with the APN IMS, QCI5, UE IP, and CSCF 322 ID for UE 301. ENB 312 transfers a connection reconfiguration message to UE 301 with the APN IMS, QCI5, UE IP, and CSCF 322 ID. UE 301 may now transfer SIP signaling to new CSCF 322 over ENB 312, SGW 314, and PGW 316—all in the target TA. This SIP path is indicated on FIG. 3 by the "3" arrows. The "3" SIP path is typically more efficient than the "2" SIP path.

Figure 7:
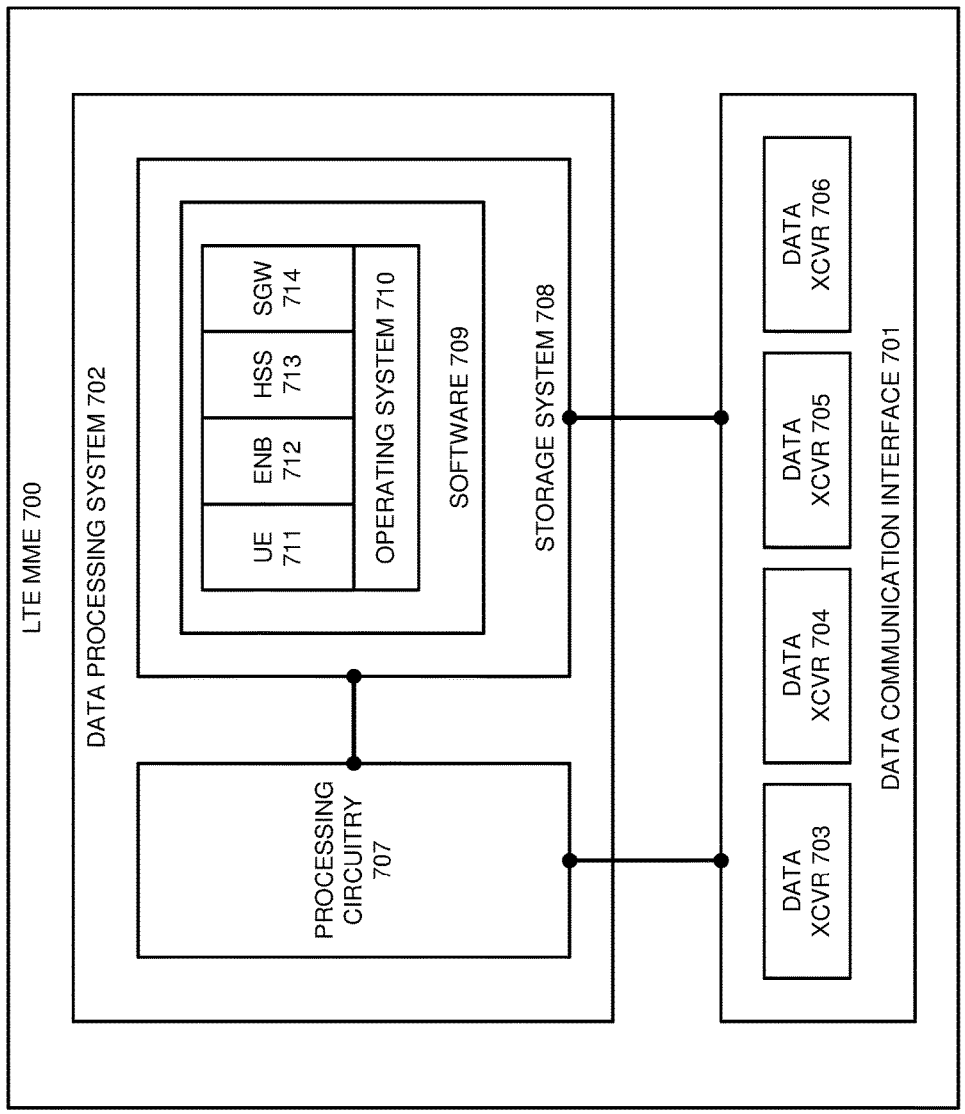
FIG. 7 illustrates an LTE Mobility Management Entity (MME) to align S-GWs and P-GWs.

FIG. 7 illustrates an LTE Mobility Management Entity (MME) to align S-GWs and P-GWs. LTE MME 700 comprises data communication interface 701 and data processing system 702. Data communication interface 701 comprises data transceivers (XCVRs) 703-706. Data XCVRs 703-706 comprise communication components, such as ports, bus interfaces, memory, software, digital signal processors, and the like.

Data processing system 702 comprises processing circuitry 707 and storage system 708. Storage system 708 stores software 709. Software 709 includes respective software modules 710-714. Processing circuitry 707 comprises CPUs and RAM. Storage system 708 comprises non-transitory, machine-readable, data storage media, such as RAM, flash drives, memory circuitry, and the like. Software 709 comprises machine-readable instructions that control the operation of processing circuitry 707 when executed.

When executed by processing circuitry 707, software modules 710-714 direct circuitry 707 to perform the following operations. Operating system 710 interfaces between software modules 711-714 and system 702 hardware. UE modules 711 handle attachment, handover, TA updates, and Non-Access Stratum (NAS) signaling. UE modules 711 notify PCRFs of SGW handovers to trigger UE reattachments in target TAs. ENB modules 712 interact with ENBs over S1-MME signaling. HSS modules 712 interact with HSSs over Diameter signaling. SGW modules 714 interact with SGWs over S11 signaling.

Figure 8:
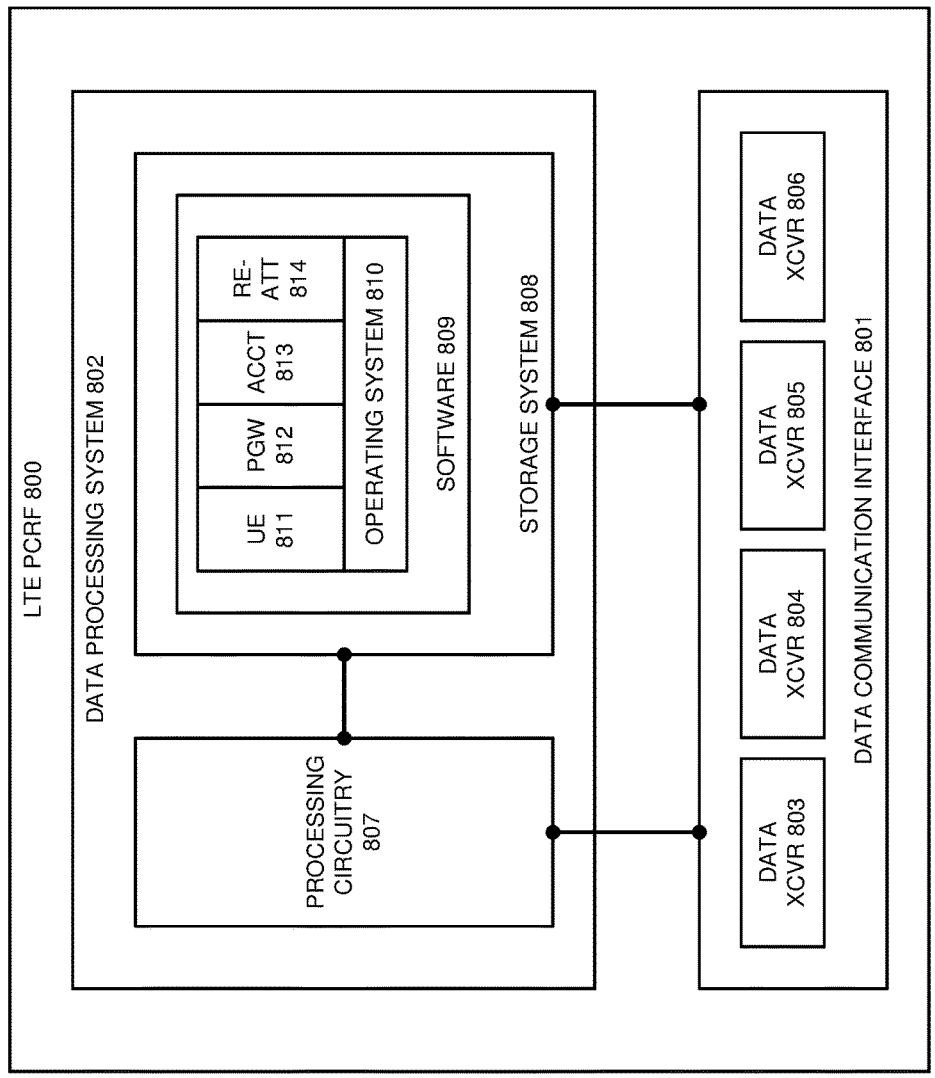
FIG. 8 illustrates an LTE Policy Charging Rules Function (PCRF) to align S-GWs and P-GWs.

FIG. 8 illustrates an LTE Policy Charging Rules Function (PCRF) to align S-GWs and P-GWs. LTE PCRF 800 comprises data communication interface 801 and data processing system 802. Data communication interface 801 comprises data transceivers (XCVRs) 803-806. Data XCVRs 803-806 comprise communication components, such as ports, bus interfaces, memory, software, digital signal processors, and the like.

Data processing system 802 comprises processing circuitry 807 and storage system 808. Storage system 808 stores software 809. Software 809 includes respective software modules 810-814. Processing circuitry 807 comprises CPUs and RAM. Storage system 808 comprises non-transitory, machine-readable, data storage media, such as RAM, flash drives, memory circuitry, and the like. Software 809 comprises machine-readable instructions that control the operation of processing circuitry 807 when executed.

When executed by processing circuitry 807, software modules 810-814 direct circuitry 807 to perform the following operations. Operating system 810 interfaces between software modules 811-814 and system 802 hardware. UE modules 811 handle QCI allocation for UEs. PGW modules 812 interact with PGWs over Diameter signaling. Accounting (ACCT) modules 813 interface with accounting systems over Diameter signaling. Reattach (REATT) modules 814 receives notice of SGW handovers from MMEs and initiate UE reattachments over the serving PGW's PCO signaling link to the UE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to align a target access gateway with a target network gateway for a wireless user device, the method comprising:
   a Mobility Management Entity (MME) detecting a wireless attachment of the wireless user device in a source Tracking Area (TA), and in response, the MME transferring an attachment message to a Policy Charging and Rules Function (PCRF) indicating the source TA for the wireless user device, wherein the wireless user device exchanges user data with an Internet Protocol Multimedia Subsystem (IMS) Call State Control Function (CSCF) server over a source access gateway and a source network gateway in the source TA;

the MME detecting a handover of the wireless user device from the source access gateway in the source TA to the target access gateway in a target TA, and in response to the access gateway handover, the MME transferring a handover message to the PCRF indicating the target TA for the wireless user device; and the PCRF receiving the attachment message and the handover message, and in response to the access gateway handover, the PCRF transferring a reattach message to the source network gateway for delivery to the wireless user device and transferring a session message to the media server indicating the reattachment of the wireless user device, wherein the wireless user device responsively reattaches in the target TA and exchanges additional user data with the IMS CSCF server over the target access gateway and the target network gateway.

2. The method of claim 1 wherein the MME comprises a Long Term Evolution (LTE) MME.

3. The method of claim 1 wherein the PCRF comprises a Long Term Evolution (LTE) PCRF.

4. The method of claim 1 wherein the access gateways comprise Long Term Evolution (LTE) Serving Gateways (S-GWs).

5. The method of claim 1 wherein the network gateways comprise Long Term Evolution (LTE) Packet Data Network Gateways (P-GWs).

6. The method of claim 1 wherein:

the wireless user device exchanging the user data over the source access gateway and the source network gateway comprises the wireless user device exchanging the user data with a source media server over the source access gateway and the source network gateway; and the wireless user device exchanging the additional user data over the target access gateway and the target network gateway comprises the wireless user device exchanging the additional user data with a target media server over the target access gateway and the target network gateway.

7. A wireless communication network to align a target access gateway with a target network gateway for a wireless user device, the wireless communication network comprising:

a Mobility Management Entity (MME) configured to detect a wireless attachment of the wireless user device in a source Tracking Area (TA), and in response, transfer an attachment message to a Policy Charging and Rules Function (PCRF) indicating the source TA for the wireless user device, wherein the wireless user device will exchange user data with an Internet Protocol Multimedia Subsystem (IMS) Call State Control Function (CSCF) server over a source access gateway and a source network gateway in the source TA;

the MME configured to detect a handover of the wireless user device from the source access gateway in the source TA to the target access gateway in a target TA, and in response to the access gateway handover, transfer a handover message to the PCRF indicating the target TA for the wireless user device; and the PCRF configured to receive the attachment message and the handover message, and in response to the access gateway handover, transfer a reattach message to the source network gateway for delivery to the wireless user device and transfer a session message to the media server indicating the reattachment of the wireless user device, wherein the wireless user device will responsively reattach in the target TA and exchange additional user data with the IMS CSCF server over the target access gateway and the target network gateway.

8. The wireless communication network of claim 7 wherein the MME comprises a Long Term Evolution (LTE) MME.

9. The wireless communication network of claim 7 wherein the PCRF comprises a Long Term Evolution (LTE) PCRF.

10. The wireless communication network of claim 7 wherein the access gateways comprise Long Term Evolution (LTE) Serving Gateways (S-GWs).

11. The wireless communication network of claim 7 wherein the network gateways comprise Long Term Evolution (LTE) Packet Data Network Gateways (P-GWs).

* * * * *